United States Patent [19]

Weirich et al.

[11] 4,378,124

[45] Mar. 29, 1983

[54] HYDRAULIC COUPLING DEVICE

[75] Inventors: Walter Weirich, Dortmund; Bernd Peters, Dulmen, both of Fed. Rep. of Germany

[73] Assignee: Gewerkschaft Eisenhutte Westfalia, Lunen, Fed. Rep. of Germany

[21] Appl. No.: 206,757

[22] Filed: Nov. 14, 1980

[30] Foreign Application Priority Data

Nov. 16, 1979 [DE] Fed. Rep. of Germany ....... 2946315

[51] Int. Cl.³ ............................................ F16L 39/00
[52] U.S. Cl. ................................. 285/137 R; 285/325
[58] Field of Search ........................... 285/137 R, 325

[56] References Cited

U.S. PATENT DOCUMENTS

| 3,590,855 | 7/1971 | Woollen | 285/137 R X |
| 3,767,234 | 10/1973 | Weirich et al. | 285/137 R |
| 3,843,172 | 10/1974 | Stevens, Jr. | 285/137 R |
| 4,113,287 | 9/1978 | Bogatirev et al. | 285/137 R |

FOREIGN PATENT DOCUMENTS 1255417 11/1967 Fed. Rep. of Germany ... 285/137 R

Primary Examiner—Thomas F. Callaghan
Attorney, Agent, or Firm—Sughrue, Mion, Zinn, Macpeak and Seas

[57] ABSTRACT

A hydraulic coupling device for connection to a multi-line hose including a plurality of hydraulic conduits bunched together comprises a casing, a plurality of plug pins housed within the casing, and a holder for holding the plug pins. The plug pins are each connectible to a respective conduit of the multi-line hose. Each of the plug pins has a circumferential groove, and the thickness of the holder is greater than the width of the circumferential grooves in the plug pins. The plug pins are held in radial slots in the holder, the radial slots being so shaped as to retain the plug pins against axial movement with respect to the holder.

11 Claims, 2 Drawing Figures

HYDRAULIC COUPLING DEVICE

BACKGROUND OF THE INVENTION

This invention relates to a hydraulic coupling device for connection to a multi-line hose constituted by a plurality of hydraulic conduits bunched together. The invention is particularly useful in the hydraulic distribution systems used in underground mine workings, particularly for hydraulically advanceable mine roof support assemblies and other hydraulic appliances.

Systems are known in which numerous hydraulic conduits are bunched together to form multi-line hoses. Multi-line hoses are interconnected by means of pairs of complementary hydraulic coupling devices. One coupling device of each pair houses a plurality of male plug pins which are attached to the conduits of one multi-line hose; and the other coupling device of that pair houses a plurality of female plug pins which are attached to the conduits of a second multi-line hose. The female plug pins mate with the male plug pins when the two coupling devices are attached (usually by the interengagement of complementary screw threads on their casings), thereby connecting the two multi-line hoses. A hydraulic coupling device of this type is described in German Patent Specification No. 1255417.

Known hydraulic coupling devices use specially-constructed plug pins, each of which has to be made to conform with the structure of the particular hydraulic coupling device it is to form part of. This leads not only to high production costs (because many different types of plug pin have to be manufactured), but also to extensive storekeeping costs (because a multiplicity of plug pins—and multi-line hoses prefabricated with such plug pins—have to be stored and indexed).

In underground mine workings, it is common for hydraulic conduits to be laid singly. Such single-line hoses are connected together by mating male and female plug pins. Such a plug pin has a circumferential groove in its exterior peripheral surface, the mating pair of plug pins being held together by means of a hose clip which engages within these grooves. Such plug pins are standardised, each plug pin having standard dimensions and having a groove of standard width, the standard dimensions and width being determined by the pressure-rating of the associated hose line. Consequently, only a few types of plug pin need to be manufactured and stored for single-line hose connections. Such plug pins will be referred to throughout this specification as "standard plug pins".

SUMMARY OF THE INVENTION

The present invention provides a hydraulic coupling device for connection to a multi-line hose constituted by a plurality of hydraulic conduits bunched together, the coupling device comprising a casing, a plurality of plug pins housed within the casing and a holder for holding the plug pins, the plug pins each being connectible to a respective conduit of the multi-line hose, wherein each of the plug pins has a circumferential groove, and wherein the thickness of the holder is greater than the width of the circumferential grooves in the plug pins, the plug pins being held in radial slots in the holder, and the radial slots being so shaped as to retain the plug pins against axial movement with respect to the holder.

Preferably, each of the plug pins is a standard plug pin (as hereinbefore defined).

The main advantage of this hydraulic coupling device, is that it can utilise standard plug pins. Thus, the manufacturing and storage costs of the plug pins of this coupling device are considerably reduced when compared with those of known coupling devices. Similar cost reductions are achieved in the storage of multi-line hoses which are of given lengths and are provided with plug pins at their ends.

Advantageously, the holder is a retaining disc at one side of which each of the radial slots is formed with cut-away portions which reduce the thickness of the retaining disc to correspond to the width of the circumferential grooves in the plug pins, and which widen the radial slots to correspond to the maximum external diameter of the plug pins. As the retaining disc is much thicker than the retaining discs of known coupling devices, it is considerably stronger, and so can resist greater traction and thrust forces which arise from changes in the hydraulic pressure in the conduits. Moreover, the relatively large thickness of the retaining disc results in an increased thickness of the disc in the arm portions thereof positioned between the radial slots. In particular, even where the plug pins are positioned relatively closely, the webs which constitute the narrowest parts of the arms are sufficiently strong to resist the traction and thrust forces. Thus, it is possible either to reduce the size of the hydraulic coupling device required for a given number of conduits, or to increase the number of conduits in the associated multi-line hose for a given size of hydraulic coupling device.

Preferably, the other side of the retaining disc is provided with a centrally-positioned, axially-extending generally cylindrical boss, the circumferential surface of which constitutes a radial support surface for the inner portions of the plug pins. Conveniently, the circumferential surface of the boss is provided with a plurality of axially-extending grooves whose shape conforms with that of the plug pins, there being the same number of axially-extending grooves as there are plug pins. Advantageously, the casing constitutes means for radially supporting the outer portions of the plug pins. In this case, the casing may support the outer portions of the plug pins via a rigid sleeve which surrounds the plug pins and is mounted within the casing. Thus, the plug pins are radially supported at both their insides and their outsides, and this leads to improved retention of the plug pins, even where the axially-directed traction and thrust forces (which act on the retaining disc) lead to slight flexing of the arms of the retaining disc.

Advantageously, the casing is constituted by a screw cap. Preferably, the screw cap is provided with an internal screw thread which is engageable with an external screw thread provided on the screw cap of a complementary hydraulic coupling device. The screw cap may be provided with a threaded ring which surrounds the rigid sleeve, the threaded ring and the screw cap retaining the holder and a flanged portion at the end of the rigid sleeve with a predetermined amount of axial play.

BRIEF DESCRIPTION OF THE DRAWING

A hydraulic coupling device constructed in accordance with the invention will now be described, by way of example, with reference to the accompanying drawings, in which.

DESCRIPTION OF PREFERRED EMBODIMENT

Figure 1:
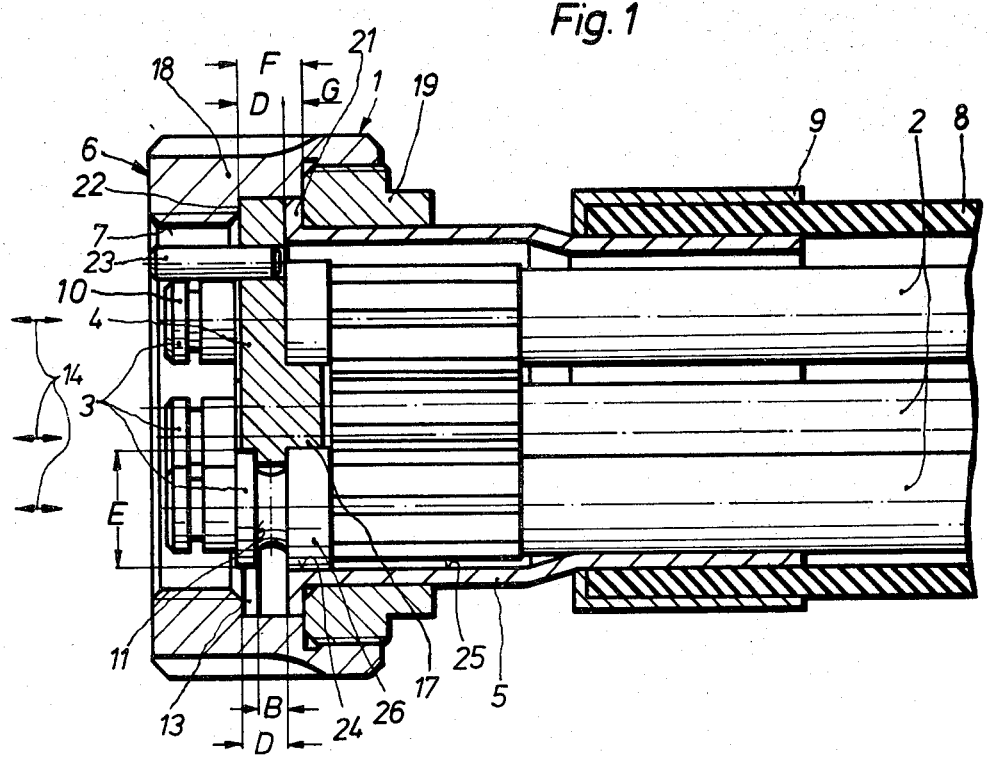
FIG. 1 is a part-sectional side elevation of the hydraulic coupling device.
Figure 2:
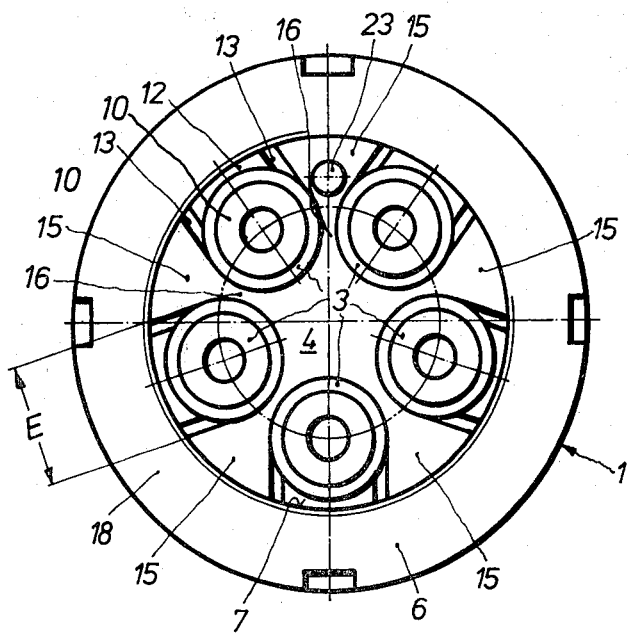
FIG. 2 is an end elevation of the hydraulic coupling device.

Referring to the drawings, FIG. 1 shows a hydraulic coupling device 1 connected to a multi-line hose which is constituted by five flexible conduits (pressure hoses) 2. Each of the flexible conduits 2 is connected to a respective male plug pin 3, the plug pins being held within a casing 6 of the coupling device 1 by means of a retaining disc 4. The retaining disc 4 is itself held in position between the flanged end 21 of a rigid sleeve 5 (which surrounds the end portion of the multi-line hose) and an internal shoulder formed by a cut-away portion 22 within the casing 6. The casing 6 takes the form of a screw cap having an internal screw thread 7. A complementary hydraulic coupling device (not shown) having female plug pins, which mate with the male plug pins 3, has an externally-threaded portion which is engageable with the screw thread 7 to connect the coupling devices together. The flexible conduits 2 of the multi-line hose are bunched together within a flexible protective sheath 8, which is press-fitted over the free end of the rigid sleeve 5 by means of a press sleeve 9.

The plug pins 3 are standard plug pins of the type used for interconnecting single-line pressure hoses. Thus, each plug pin 3 has a circumferential groove 11 (which in single-line use receives a hose collar clip for connecting to a corresponding standard female plug pin), and a spigot 10 which can be introduced into the corresponding female plug pin of the complementary hydraulic coupling device.

Each of the plug pins 3 is held in position within a respective radial slot 12 formed in the retaining disc 4. The thickness D of the retaining disc 4 is greater than the width B of the circumferential grooves 11, and one side of the retaining disc has cut-away portions 13 which reduce the thickness of the disc to correspond to the width B. The cut-away portions 13 also increase the width of the slots 12, at said one side of the disc 4, to at least the maximum external diameter E of the plug pins 3. Thus, the plug pins 3 can be inserted into the slots 12 from the periphery of the disc 4, with their grooves 11 aligned with the cut-away portions 13. The flanges defining the edges of the grooves 11 remote from the conduits 2 thus engage over the shoulders formed by the cut-away portions 13, so that the plug pins 3 are axially held firmly in position.

As the retaining disc 4 is much thicker than the retaining discs of known coupling devices, it is considerably stronger than the known retaining discs. The retaining disc 4 can, therefore, resist greater traction and thrust forces (the directions of which are indicated by the double arrows 14 in FIG. 1), which arise from changes of the hydraulic pressure in the conduits 2. Moreover, the relatively large thickness D of the retaining disc 4 results in an increased thickness of the disc in the arms 15 positioned between the slots 12. In particular, even where the plug pins 3 are positioned relatively closely together, the webs 16 which constitute the narrowest portions of the arms 15, are sufficiently strong (owing to their thickness) to resist the traction and thrust forces. Thus, even where the plug pins 3 are closely spaced, the size of the screw cap 6 can be fully exploited.

That side of the retaining disc 4 remote from the cut-away portions 13 is provided with a central cylindrical boss 17, which constitutes a radial inward support for the inner ends 26 of the plug pins 3. The radially-outer portions of the ends 26 of the plug pins 3 are supported, at 24 (see FIG. 1), by the inner cylindrical surface 25 of the rigid sleeve 5. The boss 17 is formed with five concave grooves (not shown) shaped to match the cylindrical form of the inner ends 26 of the plug pins 3, thereby increasing the radial support the boss 17 provides for the plug pins.

The screw cap 6 is of two-part construction, having an annular sleeve 18 and a threaded ring 19, the threaded ring being screwed into the annular sleeve. The rigid sleeve 5 extends through the threaded ring 19, and its flange 21 engages behind the front edge of the threaded ring. The annular sleeve 18 is provided with an internal cut-away portion 22, the width F of which is slightly larger than the combined thickness of the retaining disc 4(D) and the flange 21(G). Consequently, the retaining disc 4 and the flange 21 are held in the cut-away portion 22 in such a manner as to permit a predetermined degree of axial play. This enables the screw cap 6 to be rotated relative to the retaining disc 4 and the rigid sleeve 5, thereby permitting the hydraulic coupling device 1 to be screwed to a complementary coupling device.

The retaining disc 4 is provided with an axially-extending alignment pin 23 which engages with a complementary hole in the retaining disc of a complementary coupling device, thereby aligning the plug pins of the two coupling devices.

Although the slots 12 are shown running radially outwards and terminating at the circumferential edge of the retaining disc 4, it would be possible for these slots to run radially inwards and terminate at a central hole provided in the disc.

Although the hydraulic coupling device described above has male plug pins and a screw cap having an internal screw thread, it will be apparent that the invention is also applicable to a hydraulic coupling device having female plug pins and a screw cap having an external screw thread. The invention is, therefore, applicable to both the hydraulic coupling devices of a complementary pair of hydraulic coupling devices.

We claim:

1. A hydraulic coupling device for connection to a multi-line hose including a plurality of hydraulic conduits (2) bunched together, the coupling device comprising a casing (6), a plurality of plug pins (3) housed within the casing, and a retaining disc (4) for holding the plug pins, the plug pins each being connectible to a respective conduit of the multi-line hose, each of the plug pins having a circumferential groove (11), and the plug pins being held in radial slots (12) in the retaining disc, wherein the thickness (D) of the retaining disc is greater than the width (B) of the circumferential grooves in the plug pins, and wherein the retaining disc is formed with cut-away portions (13) in one side thereof, said cut-away portions forming widened zones of the radial slots at said one side of the retaining disc which correspond to the maximum external diameter (E) of the plug pins, said radial slots being so shaped as to retain the plug pins against axial movement with respect to the retaining disc.

2. A hydraulic coupling device according to claim 1, wherein each of the plug pins is a plug pin of industry standard dimensions.

3. A hydraulic coupling device according to claim 1, wherein said cut-away portions reduce the thickness of the retaining disc at said widened zones to correspond to the width of the circumferential grooves in the plug pins.

4. A hydraulic coupling device according to claim 3, wherein the other side of the retaining disc is provided with a centrally-positioned, axially-extending generally cylindrical boss, the circumferential surface of which provides a radial support surface for the inner portions of the plug pins.

5. A hydraulic coupling device according to claim 4, wherein the circumferential surface of the boss is provided with a plurality of axially-extending grooves whose shape conforms with that of the plug pins, there being the same number of axially-extending grooves as there are plug pins.

6. A hydraulic coupling device according to claim 3, wherein the casing provides means for radially supporting the outer portions of the plug pins.

7. A hydraulic coupling device according to claim 6, wherein the casing supports the outer portions of the plug pins via a rigid sleeve which surrounds the plug pins and is mounted within the casing.

8. A hydraulic coupling device according to claim 7, wherein the casing is constituted by a screw cap.

9. A hydraulic coupling device according to claim 8, wherein the screw cap is provided with an internal screw thread which is engageable with an external screw thread provided on the screw cap of a complementary hydraulic coupling device.

10. A hydraulic coupling device according to claim 8, wherein the screw cap is provided with a threaded ring which surrounds the rigid sleeve, the threaded ring and the screw cap retaining the holder and a flanged portion at the end of the rigid sleeve with a predetermined amount of axial play.

11. A hydraulic coupling device according to claim 1, wherein each of the plug pins is a male plug pin.

* * * * *